United States Patent
van der Lely et al.

(10) Patent No.: US 6,279,507 B1
(45) Date of Patent: Aug. 28, 2001

(54) CONSTRUCTION INCLUDING AN IMPLEMENT FOR AUTOMATICALLY MILKING ANIMALS

(76) Inventors: Cornelis van der Lely, 7 Bruschenrain; Olaf van der Lely, 11 Weinbergstrasse, both of CH-6300 Zug (CH)

(*) Notice: Subject to any disclaimer, the term of this patent is extended or adjusted under 35 U.S.C. 154(b) by 0 days.

(21) Appl. No.: 09/271,347

(22) Filed: Mar. 17, 1999

Related U.S. Application Data

(63) Continuation-in-part of application No. PCT/NL98/00398, filed on Jul. 9, 1998.

(30) Foreign Application Priority Data

Jul. 17, 1997 (NL) .................................................... 1006607

(51) Int. Cl.⁷ .............................. A01J 5/017; A01J 7/02; A01J 7/04
(52) U.S. Cl. .................................... 119/14.01; 119/14.03; 119/14.18
(58) Field of Search .............................. 119/14.01, 14.03, 119/14.18, 14.47, 14.51, 14.54, 14.55

(56) References Cited

U.S. PATENT DOCUMENTS

| | | | |
|---|---|---|---|
| 4,516,592 | * | 5/1985 | Schultz et al. ............... 134/169 C |
| 4,924,809 | * | 5/1990 | Verbrugge ..................... 119/14.02 |
| 5,345,890 | * | 9/1994 | Petersson et al. ............. 119/14.54 |
| 5,383,423 | * | 1/1995 | Van Der Lely ............... 119/14.02 |
| 5,596,945 | * | 1/1997 | Lely ................................. 119/14.03 |
| 5,722,343 | * | 3/1998 | Aurik et al. .................... 119/14.02 |

FOREIGN PATENT DOCUMENTS

| | | | |
|---|---|---|---|
| 630558 A2 | * | 12/1994 | (EP) . |
| 728412 A1 | * | 8/1996 | (EP) . |
| 96/13151 | * | 5/1996 | (WO) . |

* cited by examiner

Primary Examiner—Charles T. Jordan
Assistant Examiner—Yvonne R. Abbott
(74) Attorney, Agent, or Firm—Penrose Lucas Albright

(57) ABSTRACT

An apparatus for automatically milking animals, such as cows, which comprises teat cups for connection to the teats of the animal to be milked and separate cups for connection to the teats of the animal for the purpose of cleansing, disinfecting or foremilking the animal. The apparatus is further provided with a switching device for alternately connecting the teat cups and the separate cups to the animal's teats. Each set of cups has its own compartment for being cleaned by a fluid spray. The process is controlled and recorded for each animal or groups of animals in a computer in association with an animal identification system. Robot arms separately move each set of cups to and from the animal's teats and to and from their respective cleaning compartments, and a further robot arm has a detector such as a laser, ultrasonic sensor or camera mounted thereon for locating the animal's teats so that the two sets of cups can be connected and disconnected therefrom. While one set of cups is received by the animal's teats, the other cup set is being cleaned in their respective compartment.

48 Claims, 1 Drawing Sheet

CONSTRUCTION INCLUDING AN IMPLEMENT FOR AUTOMATICALLY MILKING ANIMALS

RELATED APPLICATION

This Application is a continuation of International Application No. PCT/NL98/00398, filed Jul. 9, 1998.

FIELD OF THE INVENTION

The invention relates to an apparatus for automatically milking animals, such as cows, which comprises teat cups capable of being connected to the teats of an animal to be milked.

BACKGROUND OF THE INVENTION

With such a construction it is important that the operations be very hygienic so that a high milk quality is obtained. In particular the teats of the animal to the be milked should preferably be cleaned before milking. With a known construction this takes place by means of the teat cups themselves. The disadvantage thereof is that cleaning fluid or contamination or both may remain behind in the teat cup and be mixed with the milk during milking. This is obviously undesirable.

Therefore, the invention's object is to obviate the above-mentioned drawback or at least to minimize same.

SUMMARY OF THE INVENTION

In accordance with the invention, this is achieved in that the apparatus comprises separate cups which are capable of being connected to the teats of an animal and by means of which these teats can be cleaned or disinfected or foremilked or any combination thereof. In this manner cleaning fluid or other contaminating substances are prevented from being mixed with the milk to be yielded thereafter.

According to a further inventive feature, the apparatus is provided with a switching means that serve the purpose of switching the separate cups from the cleaning position into foremilking positions or a stimulating position or both. In the stimulating position the animal is stimulated to yield milk at an increased rate or earlier or both. In order to facilitate the connection of separate cups, according to an inventive feature, the separate cups have a larger diameter than the teat cups. The diameter of the teat separate cups is preferably approximately one and one-half times as large as the diameter of the teat cups. For the purpose of obtaining a proper connection of the separate cups to the teats, according to a further inventive feature, the separate cups are provided near their upper sides with an enlarged contact face with which they are positioned against the udder of an animal.

In order to prevent the cleaning or disinfecting fluid (or both) of the separate cups from being mixed with milk, according to an aspect of the invention, the separate cups comprise a separate supply or discharge line (or both) for supplying or discharging (or both) cleaning fluid or disinfecting fluid or foremilk or hot water. For the purpose of adjusting the intensity of the cleaning, according to an inventive feature, the apparatus comprises pressure adjusting means with the aid of which the pressure of the fluid in the supply line can be adjusted.

For the purpose of a further automation of the apparatus, according to an inventive feature, the apparatus comprises a robot for the teat cups and a further robot of the separate cups. With the aid of such robots, the teat cups and the separate cups respectively are successively connected to the teats of an animal. For determining the position of the teats, according to an inventive feature, the apparatus comprises a yet further robot with a detector disposed thereon. According to an inventive feature, the detector comprises a laser or an ultrasonic sensor or a camera (or a combination thereof).

In accordance with another inventive feature, the apparatus comprises a first cleaning device for cleaning the teat cups, as well as a second cleaning device for cleaning the separate cups. According to a further inventive feature, the first cleaning device and the second cleaning device comprise respective spaces in which the teat cups and the separate cups respectively are cleaned with fluid. In this manner, the operation is very hygienic, which has a favorable influence on milk quality. In order to prevent cleaning fluid from splashing away, according to an inventive feature, the first cleaning device and the second cleaning device comprise respective restrictive spaces in which the teat cups and separate cups, having a function different than the teat cups, can be respectively cleaned. In a preferred embodiment of the invention, the first cleaning device is located at one longitudinal side of the milking compartment, while the second cleaning device is situated at the other longitudinal side. According to again another inventive feature, in both spaces for the cleaning devices storage means are provided for storing the teat cups and the separate cups after operation. This prevents the teat cups and the separate cups from being contaminated. According to a further aspect of the invention, the teat cups or the separate cups or both are connected to transport cables with the aid of which they can be moved to the storage means. Therefore, the invention also relates to an apparatus for automatically milking animals, such as cows, which comprises teat cups, capable of being connected to the teats of an animal to be milked, characterized in that the apparatus comprises separate cups for cleaning and disinfecting the teats and for foremilking, the teat cups or the separate cups or both being connected to transport cables with the aid of which, after completing their respective operations, they can be conveyed to the storage means.

For the purpose of an efficient way of working, according to an inventive feature, the apparatus comprises switch means with the aid of which the first cleaning device can be activated for cleaning the teat cups when the separate cups are operative, as well as switch means with the aid of which the second cleaning device can be activated for cleaning the separate cups when the teat cups are operative. Therefore, the invention furthermore relates to an apparatus for automatically milking animals, such as cows, which comprises teat cups which are capable of being connected to the teats of an animal to be milked, characterized in that the apparatus comprise separate cups for cleaning or disinfecting the teats or foremilking or a combination thereof, as well as switch means with the aid of which the separate cups can be cleaned during operation of the teat cups and also with the aid of which the teat cups can be cleaned during operation of the separate cups. According to another aspect of the invention, the switch means are activated each time after operation of both the teat cups and the separate cups.

In accordance with an inventive feature, the apparatus comprises a computer or an animal identification system or both. According to a further inventive feature, in the computer or the animal identification system or both there is recorded for each animal or each group of animals whether the teats are stimulated by means of the teat cups or by the separate cups and by means of which cups foremilking takes place.

BRIEF DESCRIPTION OF THE DRAWINGS

The invention will now be explained in further detail with reference to the accompanying drawing.

DETAILED DESCRIPTION OF THE PREFERRED EMBODIMENTS

Figure 1:
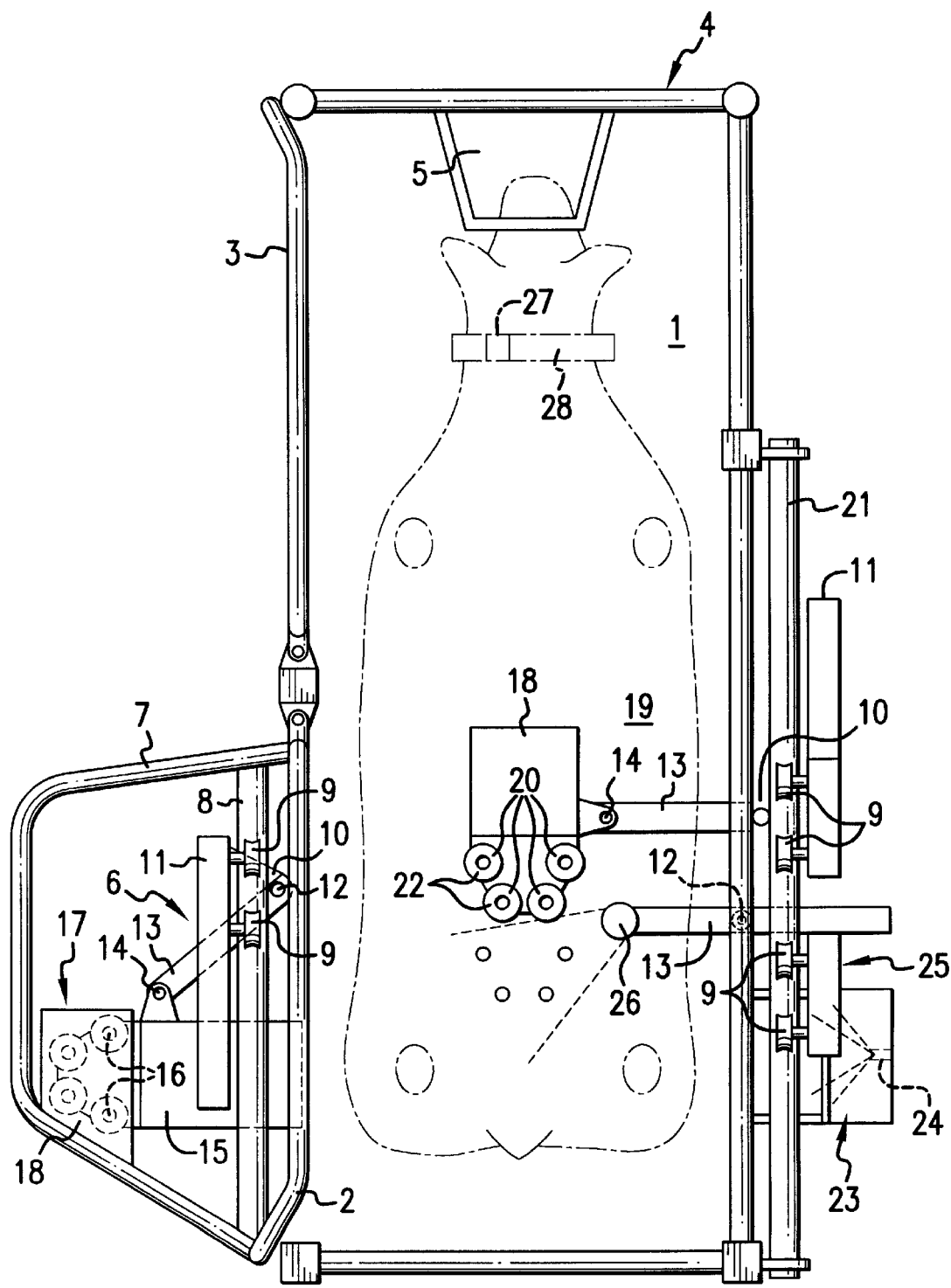
FIG. 1 shows schematically a plan view of a milking compartment, a robot arm with teat cups and a robot arm with separate cups being disposed therein.

FIG. 1 shows a milking compartment 1 provided with an entrance door 2 and an exit door 3. Near the front side of milking compartment 1, a feed trough 5 is fitted to the frame 4, in which feed trough 5 fodder, such as concentrate, can be fed to an animal present in the milking compartment.

To the entrance door 2 is fitted a milking robot 6. Milking robot 6 is surrounded by a U-shaped protective bracket 7 which is mounted on entrance door 2. Between the two legs of the U-shaped protective bracket 7 there is disposed a longitudinal guide means 8 extending in the longitudinal direction of milking compartment 1 and along which milking robot 6 can be moved via a pair of motor driven rollers 9, preferably each being driven by a stepper motor. Milking robot 6 comprises a first robot arm 10 which is fastened to a support beam 11 to which rollers 9 are attached. The first robot arm 10 is hingeably connected to a second robot arm 13 via a vertical axle 12. The second robot arm 13 itself is hingeably connected by a vertical axle 14 to a third robot arm 15 carrying four teat cups 16 at one of its ends. In the position shown in FIG. 1 teat cups 16 are inoperative. First, second and third robot arms 10, 13, 15 can be rotated relative to each other by motors, such as stepper motors or pneumatic or hydraulic, possibly servo-controlled, cylinders. Milking robot 6 can further be moved in height by a hingeable arm construction (not shown).

To U-shaped protective bracket 7, a first cleaning device 17 is fitted for cleaning the teat cups. First cleaning device 17 comprises a box shaped housing 18 in which teat cups can be cleaned by means of a fluid.

Near the other longitudinal side of milking compartment 1 is arranged a robot 19 with separate cups 20 that are capable of being connected to the animal's teats which can thus be cleaned or disinfected or foremilked or stimulated to give milk or any combination thereof. Like the previous milking robot 6, robot 19 is movable via a longitudinal guide means 21 which is fastened to frame 4 of milking compartment 1 and extends in the longitudinal direction of the milking compartment 1. Apart from cups 20, robot 19 is designed in the same manner and therefore indicated in FIG. 1 by the same reference numerals. Separate cups 20 have a larger diameter, preferably one and one-half times as large as teat cups 16. Each of separate cups 20 is further provided with a relatively large contact face 22 with which the cup, when it is connected to a teat, is situated against the udder of the animal. The large contact face 22 ensures that the interior space of separate cup 20 is properly shut off from the environmental atmosphere.

Near the same longitudinal side as where robot 19 is arranged, proximate the rear side of milking compartment 1 is disposed a second cleaning device 23 for cleaning or disinfecting separate cups 20. Like the first cleaning device 17, second cleaning device 23 is provided with a box-shaped housing 18 with a cleaning member 24 disposed therein by means of which cleaning member 24, water, air or disinfecting fluid can be sprayed both into and against separate cups 20.

To the longitudinal guide means 21 is fitted a further robot 25 in a similar manner as robot 19. Therefore, corresponding parts are indicated by the same reference numerals. At the end of arm 13 of further robot 25 is fitted a detector 26 with the aid of which the position of the teats of an animal can be determined. The detector 26 comprises a laser.

For the purpose of identifying the animal present in milking compartment 1, the apparatus comprises an animal identification system and a computer which are capable of cooperating with a data carrier 27 disposed around the neck of the animal via a collar 28.

The above described apparatus functions as follows:

The animal can enter milking compartment 1 via entrance door 2, whereafter the animal is identified by means of the animal identification system. If the animal is to be milked or to be foremilked or the animal's teats area to be cleaned, the animal is fed a predetermined quantity of concentrate in feed trough 5 via a concentrate dosage system. Then, by means of further robot 25, the position of the teats of the animal is determined. Thereafter robot 19 is activated and separate cups 20 are connected to the teats of the animal. Depending on how the computer is preprogrammed, the animal can subsequently be cleaned or disinfected or stimulated or foremilked or any combination thereof by means of separate cups 20. Thereafter separate cups 20 are moved to the second cleaning device 23 and switch means are operated by a computer in such a manner that separate cups 20 are cleaned or disinfected or both by means of second cleaning device 23. During cleaning of separate cups 20, milking robot 6 is activated and teat cups 16 are connected to the teats of the animal to be milked, whereafter the animal is milked. When it has been determined by the computer that the animal has been milked, teat cups 16 are moved to the first cleaning device 17 with the aid of milking robot 6. Subsequently switch means are activated again by the computer so that teat cups 16 are cleaned or disinfected or both. It is also possible to adjust the switch means whereby both teat cups 16 and separate cups 20 are cleaned or blown dry by air or both. Cleaning or disinfecting or blowing dry or blowing clean or any combination thereof of teat cups 16 takes place and continues, even when entrance door 2 is opened for a next animal.

Although we have disclosed the preferred embodiments of our invention, it is to be understood that it is capable of other adaptations and modifications within the scope of the following claims.

What is claimed is:

1. An apparatus for automatically milking animals, which comprises a plurality of teat cups which are capable of being connected to the teats of an animal to be milked and a separate plurality of cups having a function different than said teat cups and which can be connected to the teats of an animal to be milked and by means of which the animal's teats can be cleansed, said plurality of teat cups being carried and movable together on an end of a robot arm.

2. An apparatus in accordance with claim 1, comprising switch means for switching said separate cups from a cleansing position into a foremilking position.

3. An apparatus in accordance with claim 2, wherein said separate cups have a larger diameter than said teat cups.

4. An apparatus as claimed in claim 3, wherein the diameter of each said separate cup is approximately one and one-half times as large as the diameter of said teat cups.

5. An apparatus in accordance with claim 1, wherein said separate cups include means for selectively disinfecting or foremilking or for accomplishing both functions of said cups.

6. An apparatus in accordance with claim 1, wherein said separate cups are provided in their upper aspects with enlarged contact faces which bear against the udder of the animal to be milked when said separate cups are connected to the teats of said animal to be milked.

7. An apparatus in accordance with claim 1, comprising a conduit connected to said separate cups for selectively carrying a fluid selected from a group consisting of a cleaning fluid, a disinfecting fluid, foremilk, or hot water or a combination thereof.

8. An apparatus in accordance with claim 7, comprising pressure adjusting means for adjusting the pressure of fluid in said conduit.

9. An apparatus in accordance with claim 1, which comprises a milking robot which includes said robot arm for said teat cups and a further robot for said separate cups.

10. An apparatus in accordance with claim 9, which comprises another robot and a detector mounted thereon for determining the position of the teats of the animal to be milked.

11. An apparatus in accordance with claim 10, wherein said detector comprises a laser detector.

12. An apparatus in accordance with claim 10, wherein said detector comprises an ultrasonic sensor.

13. An apparatus in accordance with claim 10, wherein said detector comprises a camera.

14. An apparatus in accordance with claim 1, comprising a cleaning device for cleaning said teat cups.

15. An apparatus in accordance with claim 1, which comprises a cleaning device for cleaning said separate cups.

16. An apparatus as claimed in claim 1, which comprises a first cleaning device for cleaning said teat cups and a second cleaning device for cleaning said separate cups.

17. An apparatus in accordance with claim 16, wherein said first cleaning device and said second cleaning device each comprise fluid cleaning means for respectively cleaning said teat cups and said separate cups.

18. An apparatus in accordance with claim 1, which comprises a computer and an animal identification system.

19. An apparatus in accordance with claim 18, wherein said computer comprises a memory which is associated with said animal identification system and the action of each animal identified by said animal identification system by said teat cups and by said separate cups is recorded in said memory.

20. An apparatus in accordance with claim 19, wherein said memory identifies groups of animals and records the operations which the apparatus performs on said animal groups.

21. An apparatus for automatically milking animals, such as cows, which comprises teat cups which are capable of being connected to the teats of an animal to be milked, a first cleaning device and a second cleaning device respectively comprising spaces in which said teat cups and separate cups having a different function than said teat cups can be respectively cleansed.

22. An apparatus in accordance with claim 21, which comprises a milking compartment, said first cleaning device being located on one longitudinal side of said milking compartment and said second cleaning device being located on the other longitudinal side of said milking compartment.

23. An apparatus in accordance with claim 21, wherein storage means for storing said teat cups is disposed in said space of said first cleaning device and further storage means for storing said separate cups is disposed in said space of said second cleaning device.

24. An apparatus in accordance with claim 23, comprising a plurality of flexible means which are connected to said teat cups and said separate cups for moving said teat cups and said separate cups to said storage means and said further storage means respectively.

25. An apparatus for automatically milking animals, which comprises a robot arn, plurality of cups to be received by an animal to be milked that include teat cups which are carried and movable on as a group by said robot arm and are capable of being connected to the teats of said animal to be milked and separate cups for cleansing and disinfecting the teats and for foremilking of said animal to be milked, at least one of said cups being connected to flexible means for being moved to storage means after operation.

26. An apparatus in accordance with claim 25, which comprises cleaning means for said cups and switch means for activating said cleaning means for cleaning said teat cups when said separate cups are operative.

27. An apparatus in accordance with claim 25, which comprises cup cleaning means and switch means to activate cleaning said separate cups with said cup cleaning means when said teat cups are operative.

28. An apparatus for automatically milking animals, such as cows, which comprises teat cups which are capable of being connected to the teats of an animal to be milked, separate cups for cleansing the teats of said animal to be milked and switch means with the aid of which during operation of said teat cups said separate cups can be cleaned.

29. An apparatus in accordance with claim 28, wherein said switch means are activated after the operation of said separate cups is completed.

30. An apparatus for automatically milking animals, such as cows, which comprises teat cups which are capable of being connected to the teats of an animal to be milked, separate cups for cleansing the teats of said animal to be milked, and switch means with the aid of which during operation of said separate cups said teat cups can be cleaned.

31. An apparatus in accordance with claim 30, wherein said switch means are activated after the operation of said teat cups has been completed.

32. An Apparatus for automatically milking animals which comprises teat cups which are capable of being connected to the teats of an animal to be milked and a separate plurality of cups having a function different than said teat cups and which can be connected to the teats of an animal to be milled and by means of which the animal's teats are cleaned, said plurality of cups being carried and movable as a group on an end of a robot arm.

33. An apparatus in accordance with claim 32 which comprises a milking compartment which has an entrance gate and an exit gate for an animal to enter and depart from said milking compartment, said robot arm and said plurality of cups being supported on said entrance gate and movable from said entrance gate to under an animal in said milking compartment and from under said animal back to said entrance gate.

34. An apparatus for automatically milking animals which comprises teat cups which are capable of being connected to the teats of an animal to be milked and separate cups having a function different than said teat cups and which can be connected to the teats of an animal to be milked and by means of which the animal's teats can be cleansed, said separate cups including means for selectively disinfecting or foremilking or for accomplishing both functions.

35. An apparatus for milking animals, which comprises teat cups which are capable of being connected to the teats of an animal to be milked and separate cups having a function different than said teat cups and which can be connected to the teats of an animal to be milked and by means of which the animal's teats can be cleansed, the apparatus further comprising switch means for switching said separate cups from a cleansing position into a foremilking position, the diameter of each of said separate cups being larger than the diameter of said teat cups.

36. An apparatus in accordance with claim 35 wherein the diameter of each said separate cup is approximately one and one-half times as large as the diameter of said teat cups.

37. An apparatus for automatically milking animals, which comprises teat cups which are capable of being connected to the teats of an animal to be milked and separate cups having a function different than said teat cups and which can be connected to the teats of an animal to be milked and by means of which the animal's teat's can be cleansed, said separate cups being provided in their upper aspects with enlarged contact faces which bear against the udder of the animal to be milked when said separate cups are connected to the teats of said animal to be milked.

38. An apparatus for automatically milking animals, which comprises teat cups which are capable of being connected to the teats of an animal to be milked and separate cups having a function different than said teat cups and which can be connected to the teats of an animal to be milked by means of which the animal's teats can be cleansed, a conduit connected to said separate cups for selectively carrying a fluid selected from a group consisting of a cleaning fluid, a disinfecting fluid, foremilk, or hot water or a combination thereof, the apparatus further comprising pressure adjusting means for adjusting the pressure of fluid in said conduit.

39. An apparatus for automatically milking animals, which comprises teat cups which are capable of being connected to the teats of an animal to be milked, separate cups having a function different than said teat cups and which can connected to the teats of an animal to be milked by means of which the animal's teats can be cleansed, a milking robot for said teat cups, a further robot for said separate cups and another robot having a detector mounted thereon for determining the position of the teats of animals to be milked, said detector comprising an ultrasonic sensor.

40. An apparatus for automatically milking animals, which comprises teat cups which are capable of being connected to the teats of an animal to be milked and separate cups having a function different that said teat cups and which can be connected to the teats of an animal to be milked and by means of which the animal's teats can be cleansed, the apparatus further comprising a milking robot for said teat cups, a further robot for said separate cups, and another robot having a detector mounted thereon for determining the position of teats of animals to be milked, said detector comprising a camera.

41. An apparatus for automatically milking animals, which comprises teat cups which are capable of being connected to the teats of an animal to be milked and separate cups having a function different than said teat cups and which can be connected to the teats of an animal to be milked and by means of which the animal's teats can be cleansed, the apparatus further comprising a cleaning device for cleaning said teat cups.

42. An apparatus for automatically milking animals, which comprises teat cups which are capable of being connected to the teats of an animal to be milked and separate cups having a function different than said teat cups and which can be connected to the teats of an animal to be milked and by means of which the animal's teats can be cleansed, the apparatus further comprising a cleaning device for cleaning said separate cups.

43. An apparatus for automatically milking animals, which comprises teat cups which are capable of being connected to the teats of an animal to be milked and separate cups having a function different than said teat cups and which can be connected to the teats of an animal to be milked and by means of which the animal's teats can be cleansed, the apparatus further comprising a first cleaning device for cleaning said teat cups and a second cleaning device for cleaning said separate cups.

44. An apparatus in accordance with claim 43 wherein said first cleaning device and said second cleaning device each comprise fluid cleaning means for respectively cleaning said teat cups and said separate cups.

45. An apparatus for automatically milking animals which comprises a plurality of cups to be received by an animal to be milked that include teat cups which are capable of being connected to the teats of said animal to be milked and separate cups for cleaning and disinfecting the teats and for foremilking of said animal to be milked, at least one of said cups being connected to flexible means for being moved to a storage means after operation, the apparatus further comprising cleaning means for said cups and switch means for activating said cleaning means for cleaning said teat cups when said separate cups are operative.

46. An apparatus for automatically milking animals, which comprise a plurality of cups to be received by an animal to be milked that include teat cups which are capable of being connected to the teats of the said animal to be milked and separate cups for cleaning and disinfecting the teats and for foremilking of said animal to be milked, at least one of said cups being connected to flexible means for being moved to storage means after operation, the apparatus further comprising cup cleaning means and switch means to activate cleaning said separate cups with said cups cleaning means when said teat cups are operative.

47. An apparatus for automatically milking animals, which comprises teat cups which are capable of being connected to the teats of an animal to be milked and separate cups having a function different than said teat cups and which can be connected to the teats of an animal to be milked and by means of which the animal's teats can be cleansed, the apparatus further comprising a computer and an animal identification system, said computer comprising a memory which is associated with said animal identification system and the action on each animal identified by said animal identification system by said teat cups and by said separate cups being recorded in said memory.

48. Apparatus in accordance with claim 47 wherein said memory identifies groups of animals and records the operations which the apparatus performs on said animal groups.

* * * * *